US012766450B2

(12) United States Patent
Chen et al.

(10) Patent No.: US 12,766,450 B2
(45) Date of Patent: Oct. 20, 2026

(54) AIR PURIFICATION DEVICE AND CONTROL METHOD THEREOF

(71) Applicant: AirQuality Technology (Shanghai) Co., Ltd., Shanghai (CN)

(72) Inventors: Jianfeng Chen, Shanghai (CN); Shanqing Meng, Shanghai (CN); Lisun Wang, Shanghai (CN); Kui Cai, Shanghai (CN); Shidan Long, Shanghai (CN)

( * ) Notice: Subject to any disclaimer, the term of this patent is extended or adjusted under 35 U.S.C. 154(b) by 0 days.

(21) Appl. No.: 19/012,175

(22) Filed: Jan. 7, 2025

(65) Prior Publication Data

US 2025/0375727 A1 Dec. 11, 2025

Related U.S. Application Data

(63) Continuation of application No. PCT/CN2024/132604, filed on Nov. 18, 2024.

(30) Foreign Application Priority Data

Jun. 7, 2024 (CN) ........................ 202410739842.2

(51) Int. Cl.

| | |
|---|---|
| ***B01D 46/00*** | (2022.01) |
| ***B01D 46/42*** | (2006.01) |
| ***B01D 46/44*** | (2006.01) |

(52) U.S. Cl.

CPC ..... *B01D 46/0032* (2013.01); *B01D 46/0002* (2013.01); *B01D 46/4245* (2013.01); *B01D 46/44* (2013.01)

(58) Field of Classification Search

CPC ........... B01D 46/0002; B01D 46/0032; B01D 46/4245; B01D 46/44; B03C 3/34;

(Continued)

(56) References Cited

U.S. PATENT DOCUMENTS

| | | | | |
|---|---|---|---|---|
| 3,372,533 | A * | 3/1968 | Rummel | B01D 46/525 210/493.1 |
| 9,808,809 | B2 * | 11/2017 | Ueda | B03C 3/41 |

(Continued)

FOREIGN PATENT DOCUMENTS

| | | | |
|---|---|---|---|
| CN | 102661624 | A | 9/2012 |
| CN | 104436942 | A | 3/2015 |

(Continued)

*Primary Examiner* — Jennifer Dieterle
*Assistant Examiner* — Sonji Turner

(57) ABSTRACT

The present application provides an air purification device and a control method. The air purification device includes a frame body, wherein one side of the frame body is provided with an air inlet and the other side is provided with an air outlet, and the frame body is used for accommodating a micro-electrostatic module and a charging mechanism; the micro-electrostatic module comprising a filter element, wherein the filter element comprises a plurality of air channels for air circulation, and the filter element is arranged near the air outlet; and the charging mechanism is located at one side of the filter element far from the air outlet, and comprising a plurality of electrode heads distributed on the surface of the filter element, so that the discharge area of the charging mechanism covers the whole filter element.

13 Claims, 16 Drawing Sheets

(58) Field of Classification Search
CPC .... B03C 3/38; B03C 3/40; B03C 3/51; B03C 3/86; B03C 3/09; B03C 3/12; B03C 3/70; B03C 2201/04; B03C 2201/06; B03C 3/41; F24F 8/30; F24F 8/192; F24F 8/194; F24F 3/16
See application file for complete search history.

(56) References Cited

U.S. PATENT DOCUMENTS

| | | | | |
|---|---|---|---|---|
| 2006/0130658 | A1* | 6/2006 | Chang | B03C 3/12 96/97 |
| 2009/0084265 | A1* | 4/2009 | Tiefenauer | B01D 46/50 96/55 |
| 2010/0077924 | A1* | 4/2010 | Zhao | B03C 3/155 96/15 |
| 2015/0236444 | A1* | 8/2015 | Bdeir | H01R 13/6205 361/792 |
| 2024/0165638 | A1* | 5/2024 | Long | B03C 3/08 |
| 2025/0375775 | A1* | 12/2025 | Meng | B03C 3/82 |

FOREIGN PATENT DOCUMENTS

| | | | | | |
|---|---|---|---|---|---|
| CN | 204396169 | U | | 6/2015 | |
| CN | 106179751 | A | | 12/2016 | |
| CN | 207170006 | U | * | 4/2018 | |
| CN | 109731686 | A | | 5/2019 | |
| CN | 209020573 | U | * | 6/2019 | |
| CN | 111195462 | A | | 5/2020 | |
| CN | 111389589 | A | * | 7/2020 | B03C 3/08 |
| CN | 214766170 | U | * | 11/2021 | |
| CN | 216080173 | U | | 3/2022 | |
| CN | 218011667 | U | * | 12/2022 | |
| KR | 20050068045 | A | * | 7/2005 | |
| KR | 20210019822 | A | | 2/2021 | |

* cited by examiner

AIR PURIFICATION DEVICE AND CONTROL METHOD THEREOF

CROSS-REFERENCE TO RELATED APPLICATIONS

This application claims priority to Chinese Patent Application No. 2024107398422, titled "AIR PURIFICATION DEVICE AND CONTROL METHOD THEREOF", filed on Jun. 7, 2024, the entire disclosure of which is incorporated herein by reference.

TECHNICAL FIELD

The present application relates to the technical field of air purification technology, and in particular to an air purification device and a control method thereof.

REARGROUND

At present, the mainstream air purification technology is divided into medium filtration technology and electrostatic purification technology.

The medium filtration technology is mature and relatively stable, but it has high wind resistance, high fan energy consumption, easy breeding of bacteria and viruses, inability to sterilize and disinfect, produces odor, needs to be replaced frequently, generates a large number of consumables, has high operation and maintenance costs, no energy saving and no environmental protection.

Electrostatic purification technology can remove particles, sterilize and disinfect, have low resistance, and can be washed repeatedly. However, due to its low purification efficiency, high relative power, easy ignition, high ozone, poor safety, short service life, heavy weight and high maintenance cost, not energy-saving or environmentally friendly, it can not be widely popularized and applied in the field of light pollution air purification, and can only be used in few scenes.

Micro-electrostatic technology is compatible with the advantages of medium filtration technology and electrostatic purification technology, taking into account high-efficiency purification and dust removal, sterilization and disinfection, and has the technical advantages of ultra-low power, low resistance, high humidity resistance, high safety, repeated cleaning, no consumables and service life of up to 10 years.

In the present market, there is a lack of an ultra-thin, ozone-free, low-cost, high-stability, repeated cleaning without consumables, high adaptability, green, energy-saving and environment-friendly electric purification technology and product.

Therefore, the existing technology needs further development.

SUMMARY

This application addresses the limitations of current technology by presenting an air purification device and a control method, so as to solve the technical problem that the installation scene of an air purification device is limited in the related art.

To achieve the above purpose, the present application adopts the following technical solutions.

In a first aspect, the present application provides an air purification device, including: a frame body, wherein one side of the frame body is provided with an air inlet and the other side is provided with an air outlet, and the frame body is used for accommodating a micro-electrostatic module and a charging mechanism; the micro-electrostatic module comprising a filter element, wherein the filter element comprises a plurality of air channels for air circulation, and the filter element is arranged near the air outlet; and the charging mechanism is located at one side of the filter element far from the air outlet, and comprising a plurality of electrode heads distributed on the surface of the filter element, so that the discharge area of the charging mechanism covers the whole filter element.

The present technical scheme is further set as follows, the charging mechanism further includes: a first accommodating groove, and the first accommodating groove is inside the frame body; and a electrode body, and the electrode body is arranged along the length direction of the first accommodating groove, and one of the plurality of electrode heads extends through the groove wall of the first accommodating groove and is connected with the electrode body.

The present technical scheme is further set as follows, the charging mechanism further comprises a plurality of first accommodating grooves and a plurality of electrode bodies, the plurality of first accommodating grooves are arranged at intervals, and the plurality of electrode bodies located in different of the first accommodating grooves are connected end to end in sequence.

The present technical scheme is further set as follows, an arrangement direction of the plurality of electrode heads is parallel to the plane of the frame body is located, both sides of the first accommodating groove are connected with the electrode heads, and the distance between two adjacent electrode heads located on the same side of the same first containing groove is equal to the distance between two adjacent first containing grooves.

The present technical scheme is further set as follows, the electrode heads located on both sides of the same first accommodating groove are arranged in parallel to form a plurality of electrode head pairs, and the electrode head pairs located in different first accommodating grooves are arranged in a staggered or matrix manner.

The present technical scheme is further set as follows, the electrode heads located at both sides of the same first containing groove are staggered.

The present technical scheme is further set as follows, the charging mechanism further comprises a conductive discharge plate, and the conductive discharge plate is located at one side of the electrode heads far away from the filter element, and the conductive discharge plate is provided with a discharge conductive hole matched with the electrode head.

The present technical scheme is further set as follows, the first accommodating groove is detachably connected with the inside of the frame body, and two ends of the first accommodating groove are provided with notches matched with the frame body, and when the first accommodating groove is installed inside the frame body, the first accommodating groove does not exceed the outer surface of the frame body.

The present technical scheme is further set as follows, the frame body comprises a first frame and a second frame, the first frame and the second frame are oppositely arranged, and the first frame and the second frame are splicable complementary structures.

The present technical scheme is further set as follows, a power supply bin is arranged on the frame body, the power supply bin comprises a high-voltage power supply, and the high-voltage power supply is electrically connected with the charging mechanism and the filter element.

The present technical scheme is further set as follows, the high-voltage power supply is connected with an external power supply through a power adapter, one end of the power supply bin is provided with a power adapter for switching the power supply, the power adapter is provided with a magnetic attraction female head for providing electrical connection for the high-voltage power supply, and the power adapter is connected with a magnetic attraction male head matched with the magnetic attraction female head.

The present technical scheme is further set as follows, the filter element is provided with a fixing groove, the frame body is connected with the filter element through a fixing part, the fixing part is embedded in the fixing groove, and the fixing part is connected with the frame body and the filter element to fix the filter element.

The present technical scheme is further set as follows, the fixing part comprises a boss integrally formed with the frame body, and the boss extends along a direction close to the filter element, and the boss is embedded in the fixing groove.

The present technical scheme is further set as follows, the filter element comprises a plurality of dust-collecting sheets arranged in a stacked manner and a plurality of spacers arranged between the dust-collecting sheets, the air channels are formed between the dust-collecting sheets and the spacers, and a conductive material are wrapped in the dust-collecting sheets, and the conductive material comprise an avoidance groove, and the avoidance groove is arranged corresponding to the fixing groove.

In a second aspect, the present application provides a control method for controlling the above air purification device, the present technical scheme is further set as follows, and the method includes:

- obtaining, by a high-voltage power supply, the wind dynamic situation and determining whether it is necessary to supply power to the micro electrostatic device;
- when power supply is needed, a switch SB and a fuse FU entering a power transformer TR, being rectified by diodes VD1~VD4, and being filtered by capacitor C1, and then providing a bias voltage to the base of the VT through a primary winding N1 stage of a booster transformer TU, a potentiometer RP and a resistor R, and at the same time, supplying power to a collector of the VT through N1 and N2, and the VT starts to conduct;
- making, by a oscillation of the booster transformer TU, a current of the N1 further strengthen the current of the base of VT, and making the VT turn off from saturated on state, thus making the oscillation circuit turn on and off repeatedly; and
- making, a single-chip microcomputer in the high-voltage power supply, a logical judgment according to a monitored high voltage and current, and determining whether to stop outputting high-voltage.

Beneficial Effects of the Present Application

1. The micro-electrostatic module and the charging mechanism are integrated into the same frame body to reduce the thickness of the air purification device, and the ion concentration released per unit volume is higher, thus saving the installation space of the air purification device, and the application range is wider, especially in the purification scene where the installation size is very limited in the width direction, and the overall performance of the air purification device can be better exerted.
2. A plurality of electrode heads are evenly distributed on the surface of the filter element, making the discharge is more sufficient, without any charging blind area, the charging uniformity of particles is better, and the charging effect is better.

DETAILED DESCRIPTION OF THE EMBODIMENTS

In order to enable those in the technical field better understand the solutions of the present application, the technical solutions in the embodiment of the present application will be described clearly and completely with the attached drawings. Obviously, the described embodiment is only a part of the embodiment of the present application, but not the whole embodiment. Based on the embodiment in this application, all other embodiment obtained by ordinary technicians in this field without creative work should belong to the protection scope of this application.

Figure 1:
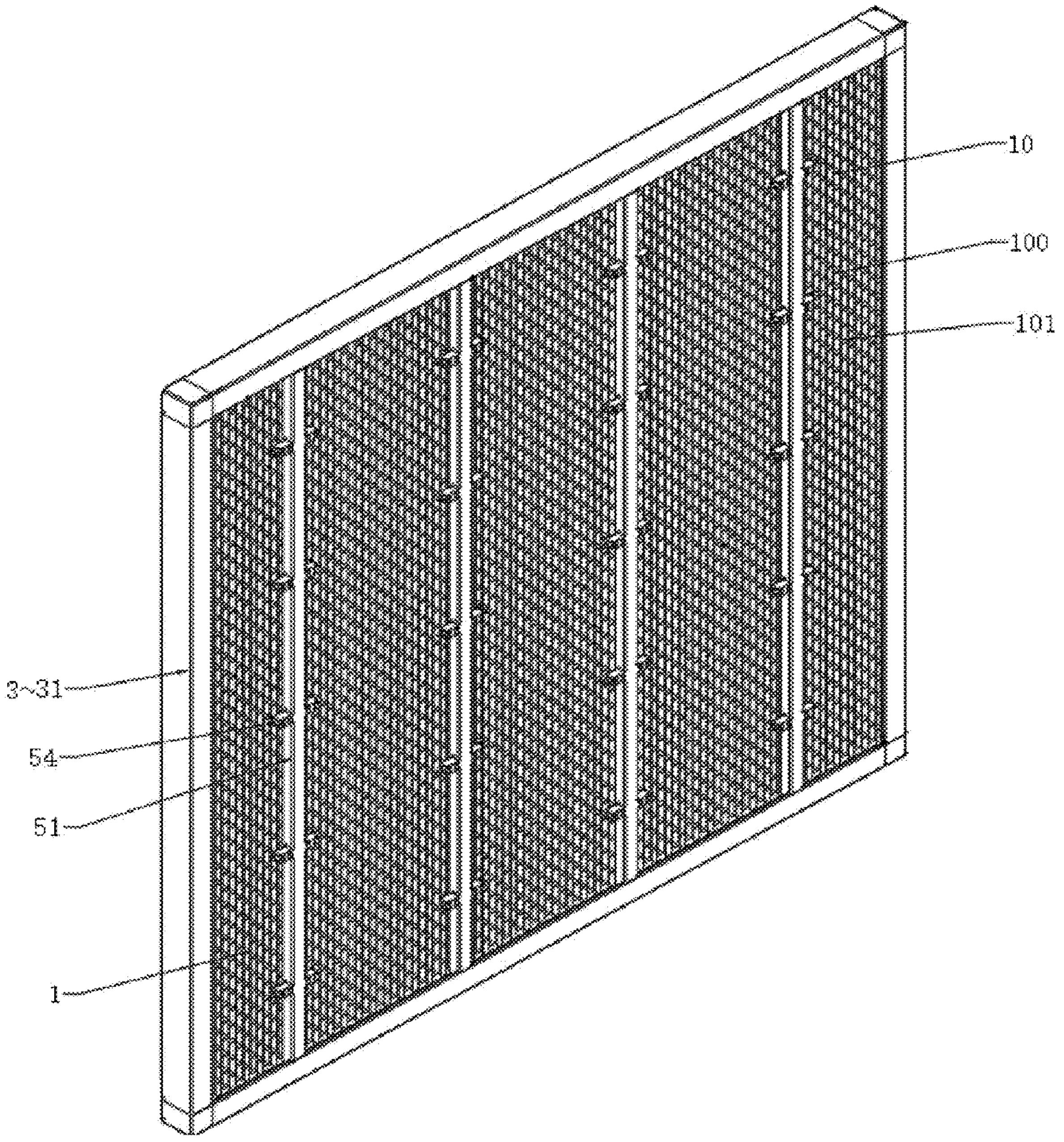
FIG. 1 is a schematic diagram of an air purification device according to an embodiment of the present application.
Figure 2:
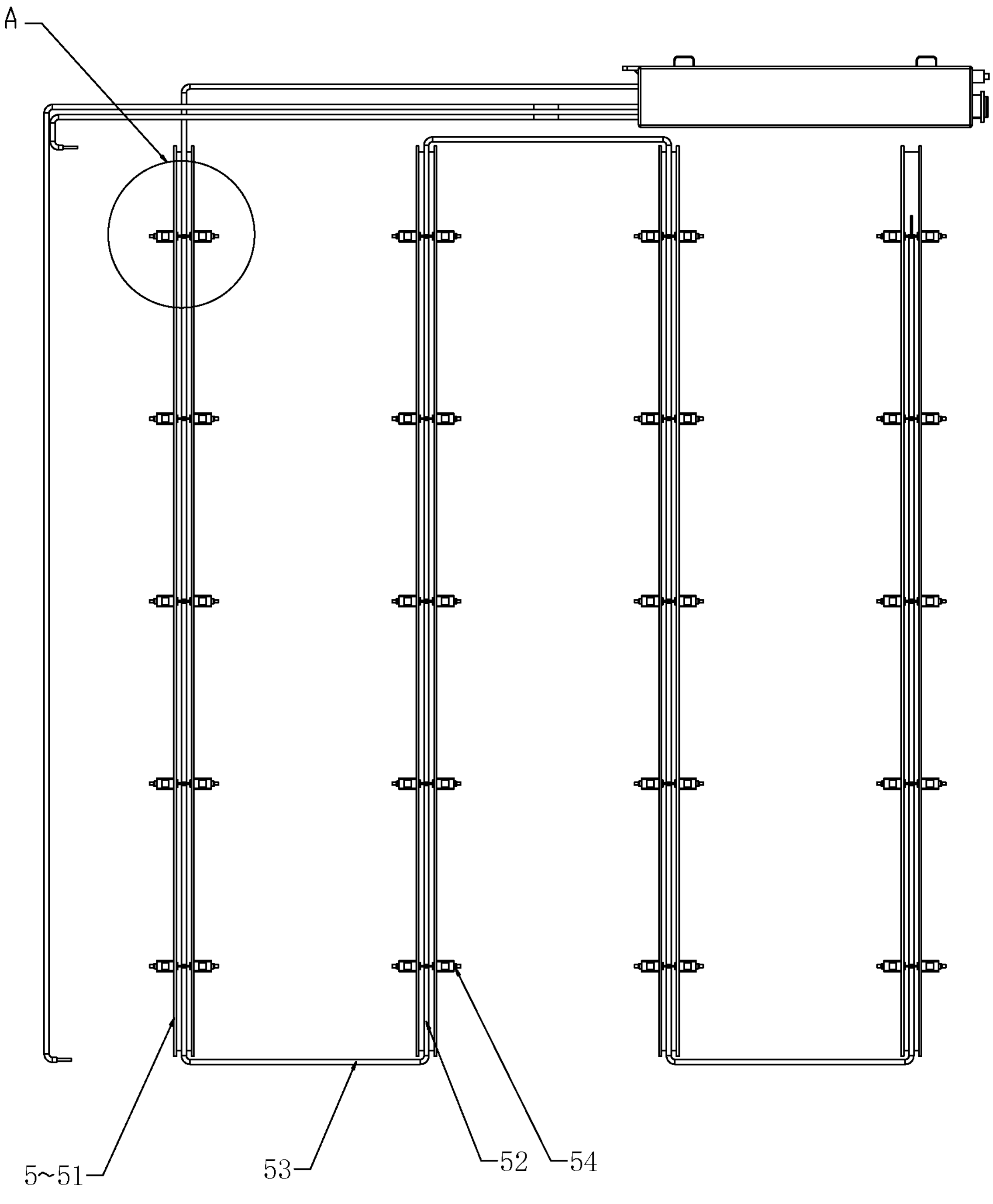
FIG. 2 is a schematic diagram of a charging mechanism according to an embodiment of the present application.
Figure 3:
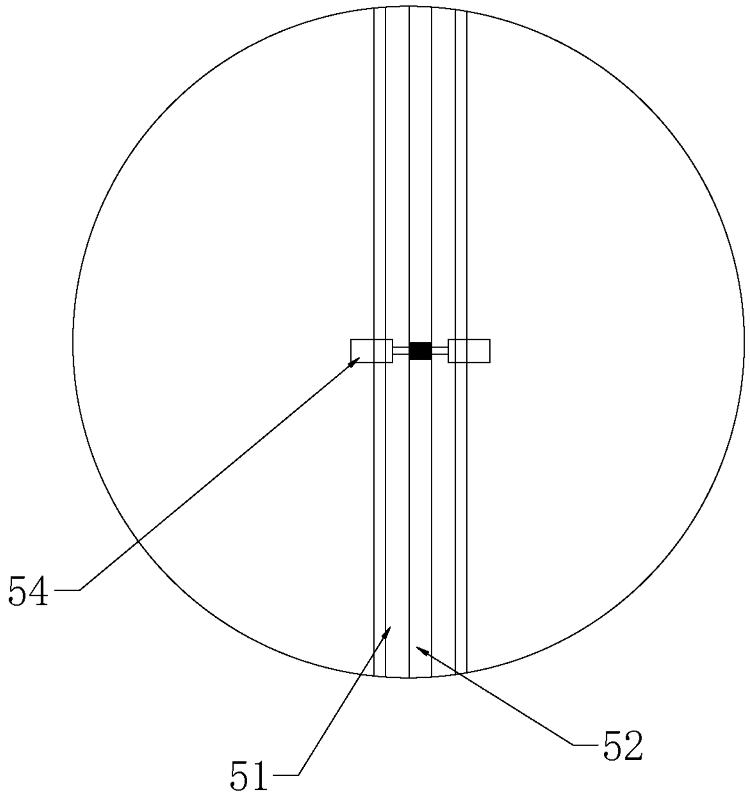
FIG. 3 is a partial enlarged view at A in FIG. 2 according to an embodiment of the present application.

According to an embodiment of the present application, an air purification device is provided, referring to FIGS. 1 to 3, including: a frame body 3, wherein one side of the frame body is provided with an air inlet and the other side is provided with an air outlet; the micro-electrostatic module comprising a filter element 1, wherein the filter element 1 comprises a plurality of air channels 10 for air circulation, and the filter element 1 is arranged near the air outlet; the charging mechanism 5 is located at one side of the filter element 1 far from the air outlet, and comprising a plurality of electrode heads 54 distributed on the surface of the filter element 1, so that the discharge area of the charging mechanism 5 covers the whole filter element 1.

It should be noted that the micro-electrostatic module and the charging mechanism 5 are integrated into the same frame body 3 to reduce the thickness of the air purification device, and the ion concentration released per unit volume is higher, thus saving the installation space of the air purification device, having a wider application range, especially in the purification scene that the installation size is very limited in the width direction, can better play the overall performance of the air purification device; In addition, a plurality of electrode heads 54 are distributed on the surface of the filter element 1, so that the discharge is more sufficient, there is no charging blind area, the charging uniformity of particles is better, and the charging effect is better.

In the air purification device of this embodiment, the charging mechanism 5 further includes: a first accommodating groove 51 and the first accommodating groove 51 is inside the frame body 3; and a electrode body, and the electrode body is arranged along the length direction of the first accommodating groove 51, and one of the plurality of electrode heads 54 extends through the groove wall of the first accommodating groove 51 and is connected with the electrode body. The included angle between the arrangement direction of the electrode heads 54 and the plane of the frame body 3 is no more than 90 degrees, and a plurality of the electrode heads 54 are arranged at intervals along the electrode body.

It should be noted that, on the one hand, the first accommodating groove 51 for accommodating the electrode body 52 is arranged inside the frame body 3, and the included angle between the arrangement direction of the electrode head 54 and the plane of the frame body 3 is less than 90 degrees, and the electrode heads 54 do not exceed the outer surface of the frame body 3, thus reducing the overall thickness of the charging mechanism 5, thus further saving the installation space of the air purification device; moreover, the electrode heads 54 are arranged in the windward direction, and in the production, transportation, installation and maintenance links, etc. On the other hand, the new type of charged discharge is adopted, and the electrode heads 54 are evenly arranged, making the discharge more sufficient, without charging blind area, the charging uniformity of particles is better, and the charging effect is better.

Specifically, the electrode head 54 is a carbon fiber brush, a bundle of metal wires, or a metal tip. The carbon fiber brush includes a plurality of bundled carbon fiber filaments and insulating tubes, and is electrically connected with the electrode body 52 through conductive wires.

The first accommodating groove 51 is made of insulating material, and the electrode body 52 and the connector for connecting the electrode head 54 and the electrode body 52 are sealed in the first accommodating groove 51 by insulating sealant.

In the air purification device of this embodiment, a plurality of first accommodating grooves 51 are arranged at intervals, and electrode bodies 52 located in different first accommodating grooves 51 are connected end to end in order to form an S-bend shape.

Specifically, a plurality of electrode bodies 52 located in different first accommodating grooves 51 may be electrically connected by wires 53 or by other means.

Figure 4:
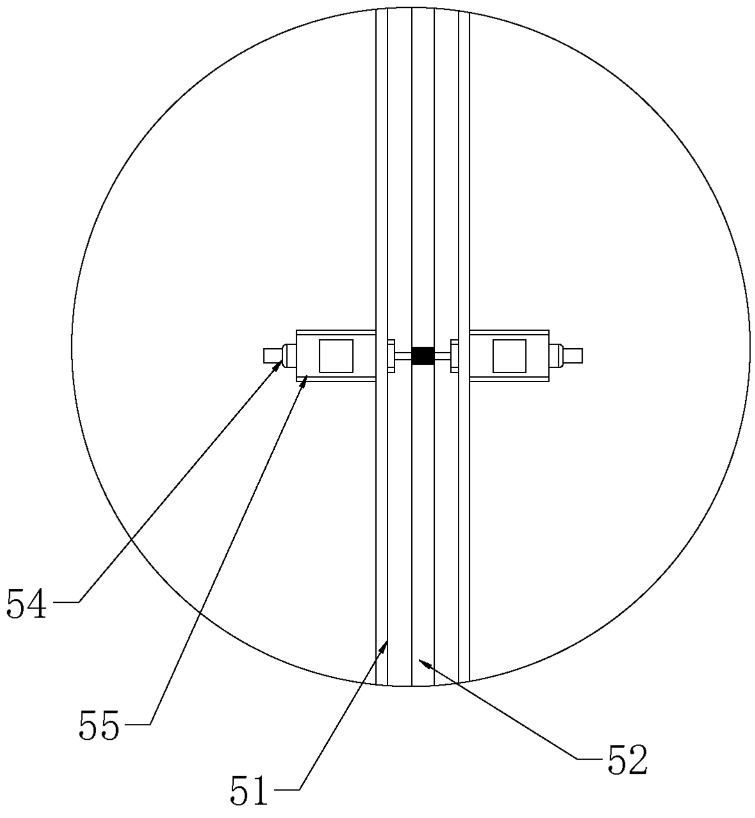
FIG. 4 is a partial enlarged view at A in FIG. 2 according to another embodiment of the present application.

In the air purification device of this embodiment, please refer to FIG. 4, a second accommodating groove 55 for accommodating the electrode heads 54 is fixedly arranged outside the groove wall of the first accommodating groove 51, and the second accommodating grooves 55 are arranged in one-to-one correspondence with the electrode heads 54. The second accommodating groove 55 is used for supporting the electrode heads 54 to avoid the electrode heads 54 from deviating due to collision.

In the charging mechanism of this embodiment, the included angle between the arrangement direction of the electrode heads 54 and the plane that the frame body 3 is located is greater than or equal to 0 degrees and less than or equal to 60 degrees, so as to further reduce the thickness of the charging mechanism. The electrode heads 54 are connected to both sides of the first accommodating groove 51, and the distance between two adjacent electrode heads 54 located on the same side of the same first accommodating groove 51 is equal to the distance between two adjacent first accommodating grooves 51. When the electrode heads 54 are made of a hard material such as a metal tip, the electrode heads 54 do not extend beyond the outer surface of the frame body 3, so as to reduce the installation space occupied by the charging mechanism; When the electrode head 54 is made of flexible materials such as carbon fiber brushes, the electrode head 54 can extend beyond the outer surface of the frame body 3, preferably, the length of the electrode heads 54 beyond the outer surface of the frame body 3 do not exceed 50% of the total length of the flexible material. By using the flexibility of the flexible material, the charging mechanism can smoothly pass through the limited installation site when installed in a limited space. After being installed in place, due to the self-recoverability of the flexible material, and the front end of the electrode head 54 after installation is an open space not less than the thickness space of the frame body 3, and the flexible material can be automatically restored to its original state, so that the included angle between the arrangement direction of the electrode heads 54 and the plane of the frame 3 can be increased as much as possible, and the flexible material is not easy to cause accidental injury to workers. From the charging principle, the bigger the included angle, the better the charging effect.

It is worth mentioning that when the included angle between the arrangement direction of the electrode heads 54 and the plane that the frame 3 is located is more than 60 degrees, it can be used in scenes with large installation space. For example, when the arrangement direction of the electrode head 54 is perpendicular to the plane that the frame body 3 is located, the electrode head 54 can extend beyond the outer surface of the frame body 3 by a certain distance, preferably, the length of the electrode heads 54 beyond the outer surface of the frame body 3 do not exceed 50% of the total length of the flexible material, which can smoothly pass through the restricted installation site by using the flexible characteristics of the carbon fiber brush, and after being installed in place, the flexible material can automatically recover to its original state due to its own recoverability. Similarly, it can also improve the utilization rate of installation space and meet the same ionization effect. The ionization device can be made thinner and has a wider application range.

Figure 5:
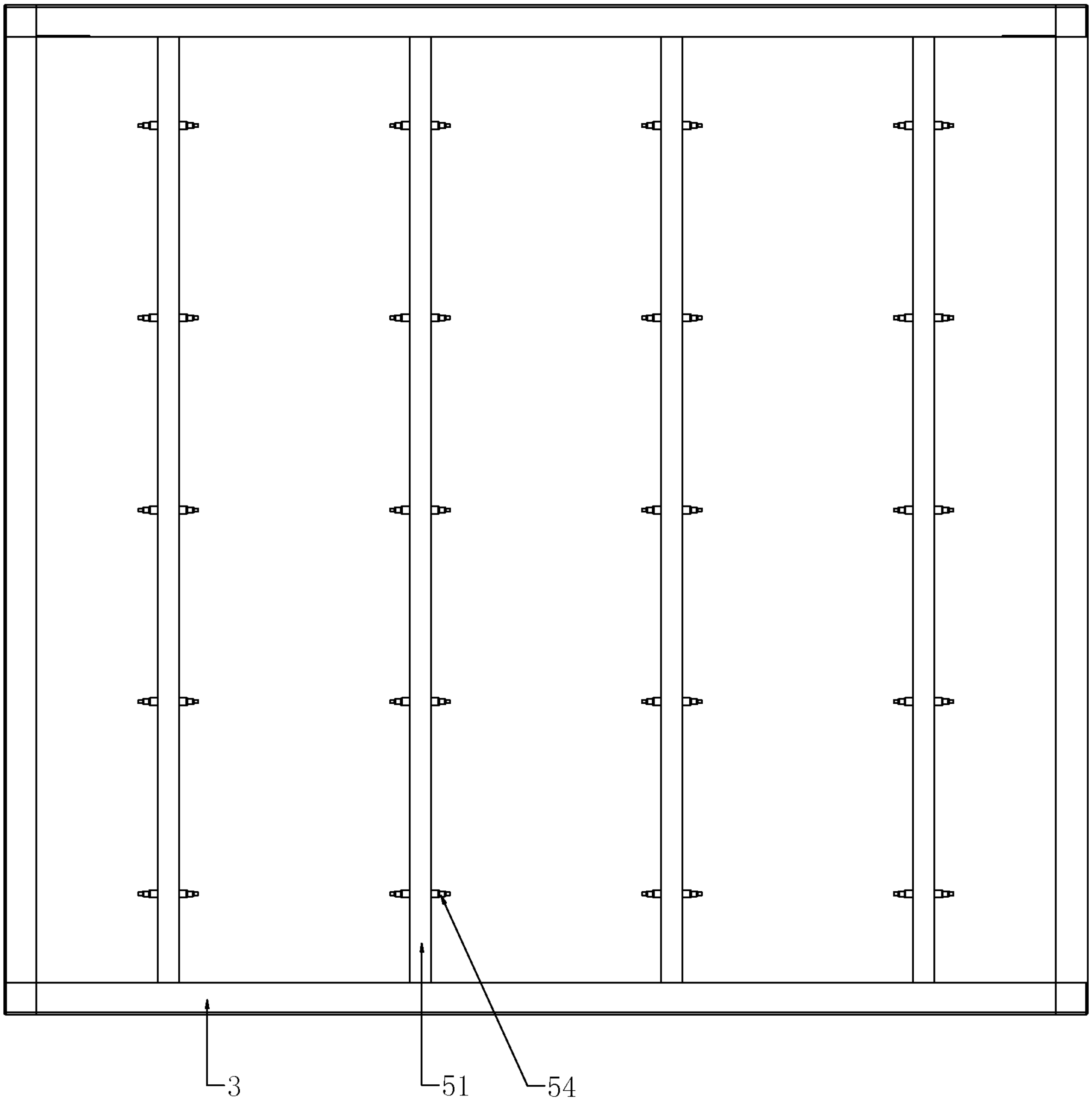
FIG. 5 is a schematic diagram of the arrangement of electrode heads according to an embodiment of the present application.

In the air purification device of this embodiment, please refer to FIG. 5, the included angle formed by the arrangement direction of the electrode heads 4 and the plane that the frame body 3 is located is 0 degrees, that is, the arrangement direction of the electrode head 4 is parallel to the plane that the frame body 1 is located, so that the production and processing are more convenient, and the charging effect can meet the use of the charging mechanism. Both sides of the first accommodating groove 51 are connected with the electrode heads 54, and the distance between two adjacent electrode heads 54 located on the same side of the same first accommodating groove 51 is equal to the distance between two adjacent first accommodating grooves 51. The electrode heads 54 located on both sides of the same first accommodating groove 51 are arranged in parallel to form a plurality of electrode head pairs, and the electrode head pairs located in different first accommodating grooves 51 are arranged in a matrix. This is that arrangement mode 1 of the electrode heads 54.

Figure 6:
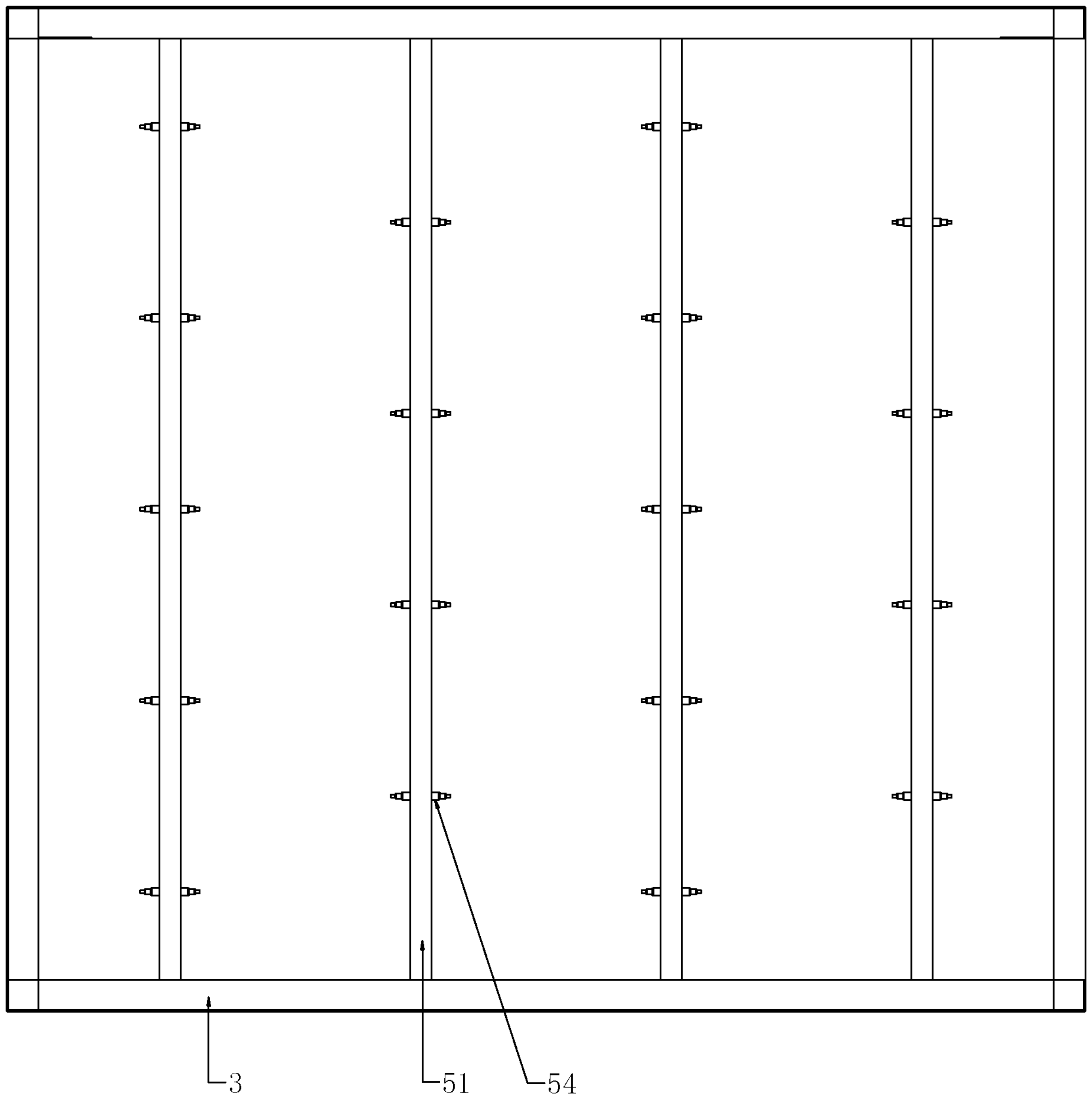
FIG. 6 is a schematic diagram of other arrangement of electrode heads according to an embodiment of the present application.

In the air purification device of this embodiment, please refer to FIG. 6, the included angle formed by the arrangement direction of the electrode heads 4 and the plane that the frame 3 is located is 0 degrees. Both sides of the first accommodating groove 51 are connected with the electrode heads 54, and the distance between two adjacent electrode heads 54 located on the same side of the same first accommodating groove 51 is equal to the distance between two adjacent first accommodating grooves 51. The electrode heads 54 located on both sides of the same first accommodating groove 51 are arranged in parallel to form a plurality of electrode head pairs, and the electrode head pairs located in different first accommodating grooves 51 are staggered. This is that arrangement mode 2 of the electrode heads 54.

It should be noted that the electrode heads are staggered, and the discharge areas formed by the electrode heads 54 located on the opposite sides of two adjacent first accommodating grooves 51 partially overlap, which can effectively ensure that the discharge areas completely cover the whole frame body 3.

Figure 7:
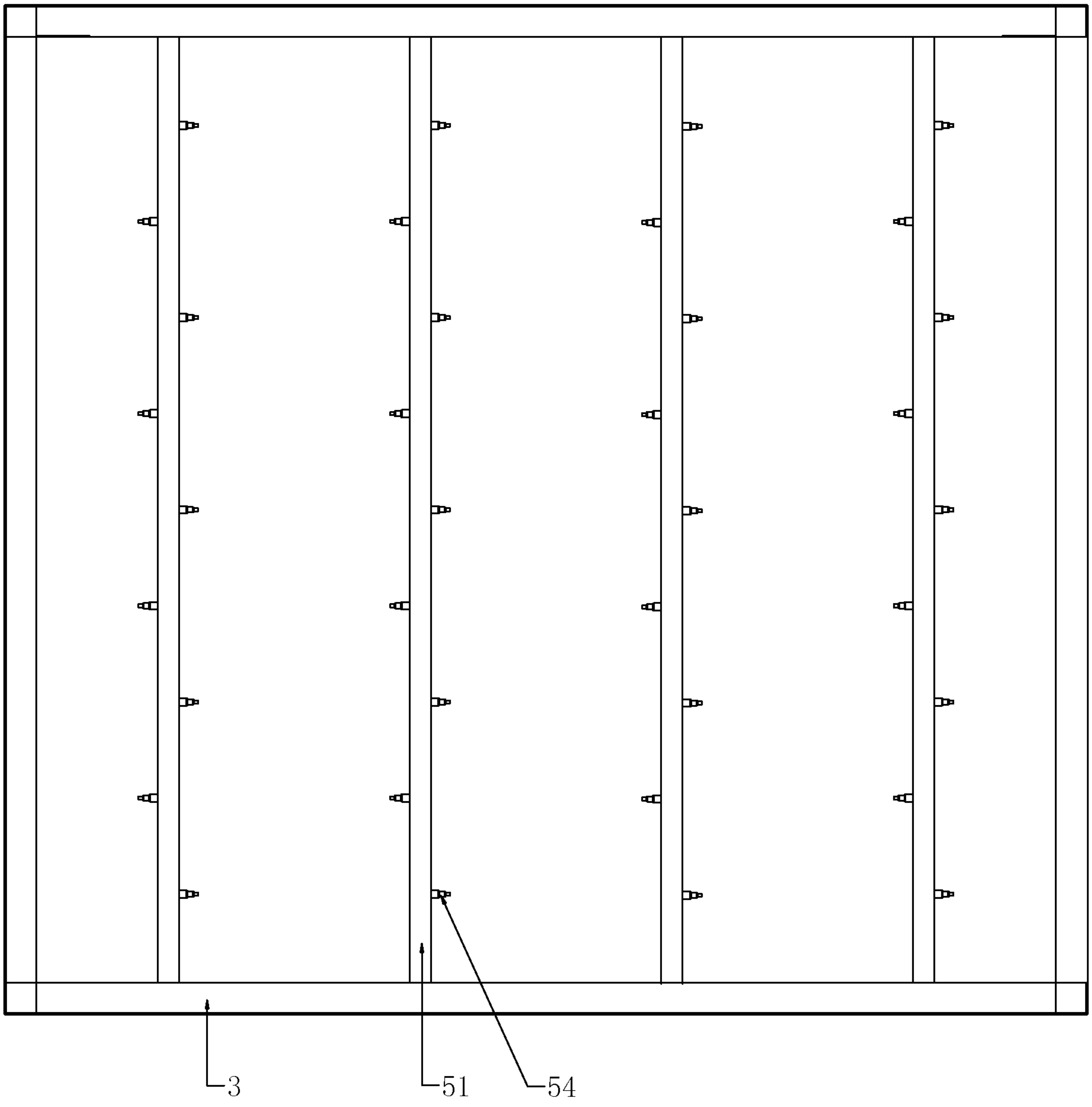
FIG. 7 is a schematic diagram of another arrangement of electrode heads according to an embodiment of the present application.

In the air purification device of this embodiment, please refer to FIG. 7. The included angle formed by the arrangement direction of the electrode heads 4 and the plane that the frame body 3 is located is 0 degrees. Both sides of the first accommodating groove 51 are connected with the electrode heads 54, and the distance between two adjacent electrode heads 54 located on the same side of the same first accommodating groove 51 is equal to the distance between two adjacent first accommodating grooves 51. The electrode heads 54 located on both sides of the same first accommodating groove 51 are staggered, and the electrode heads 54 on several first accommodating grooves 51 are arranged in the same way. This is that arrangement mode 3 of the electrode heads 54.

In order to verify the performance differences of three electrode heads 54 arrangements, a comparative test was made in a standard laboratory. Using the same micro-electrostatic module (micro-electrostatic module wraps conductive material with dielectric material to form electrode plates, and uses strong electric field between electrode plates to capture charged particles in the air), and then matching with three kinds of charging mechanisms 5, the purification efficiency of PM 2.5 of carbon fiber brush electrode heads 54 are compared under the same working environment and the same wind speed. In order to reduce the test error, the purification efficiency of PM2.5 is compared by continuously testing three groups of data and taking the average value.

| Temperature ° C. | Relative humidity % | Description of the arrangement of electrode heads 54 / | Micro-electrostatic module number / | Ventilation size width mm | Ventilation size height mm | Wind speed m/s | Purification efficiency of PM 2.5 % | |
|---|---|---|---|---|---|---|---|---|
| 24.5 | 50 | arrangement mode 1 | 1# | 490 | 400 | 1 | 95.3 | 95.7 |
| | | | | 490 | 400 | 1 | 96.1 | |
| | | | | 490 | 400 | 1 | 95.8 | |
| 24.5 | 50 | arrangement mode 2 | 1# | 490 | 400 | 1 | 98.8 | 99.1 |
| | | | | 490 | 400 | 1 | 99.8 | |
| | | | | 490 | 400 | 1 | 98.7 | |
| 24.5 | 50 | arrangement mode 3 | 1# | 490 | 400 | 1 | 96.7 | 97.7 |
| | | | | 490 | 400 | 1 | 98.2 | |
| | | | | 490 | 400 | 1 | 98.1 | |

By comparing the test data, it can be seen that the three kinds of charging mechanisms 5 are equipped with the same micro-electrostatic module, all of which have higher purification efficiency of PM2.5, which shows that the three kinds of charging mechanisms 5 in the form of electrode heads 54 have good charging effects, and the charging effects are as follows: arrangement mode 2>arrangement mode 3>arrangement mode 1.

Preferably, in order to make full use of the discharge area of the electrode heads 54, a plurality of first accommodating grooves 51 are arranged in parallel and equidistantly, and the distance between the first accommodating groove 51 on the side and the frame body 3 is not more than ½ of the distance between two adjacent first accommodating grooves 51.

Figure 8:
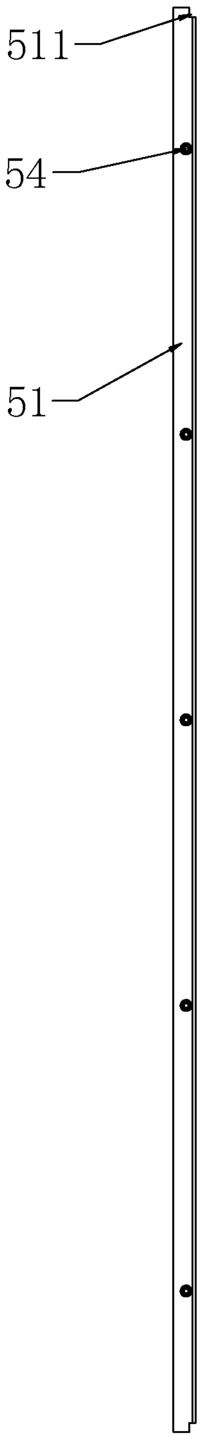
FIG. 8 is a schematic view of the first accommodating groove according to the present application.

In the air purification device of this embodiment, please refer to FIG. 8, the first accommodating groove 51 is detachably connected with the inside of the frame body 3, and both ends of the first accommodating groove 51 are provided with notches 511 matched with the frame body 3. When the first accommodating groove 51 is installed inside the frame body 3, the first accommodating groove 51 does not exceed the outer surface of the frame body 3.

It should be noted that the two ends of the first accommodating groove 51 are provided with notches 511 matched with the frame body 3, so that the two ends of the first accommodating groove 51 are just embedded in the frame body 3. The frame body 3 where the notches 511 are located plays a limiting role on the first accommodating groove 51, which increases the stability of the first accommodating groove 51. The depth of the notches 511 is less than or equal to the wall thickness of the frame body 3, which ensures that the first accommodating groove 51 will not exceed the plane of the frame body 31 after installation, and further saves the charging mechanism 5.

Preferably, reinforcing ribs are added between adjacent first accommodating grooves 51. When the area of the charging mechanism 5 is large, the structural strength and stability are increased by the reinforcing ribs between the first accommodating grooves 51.

Figure 10:
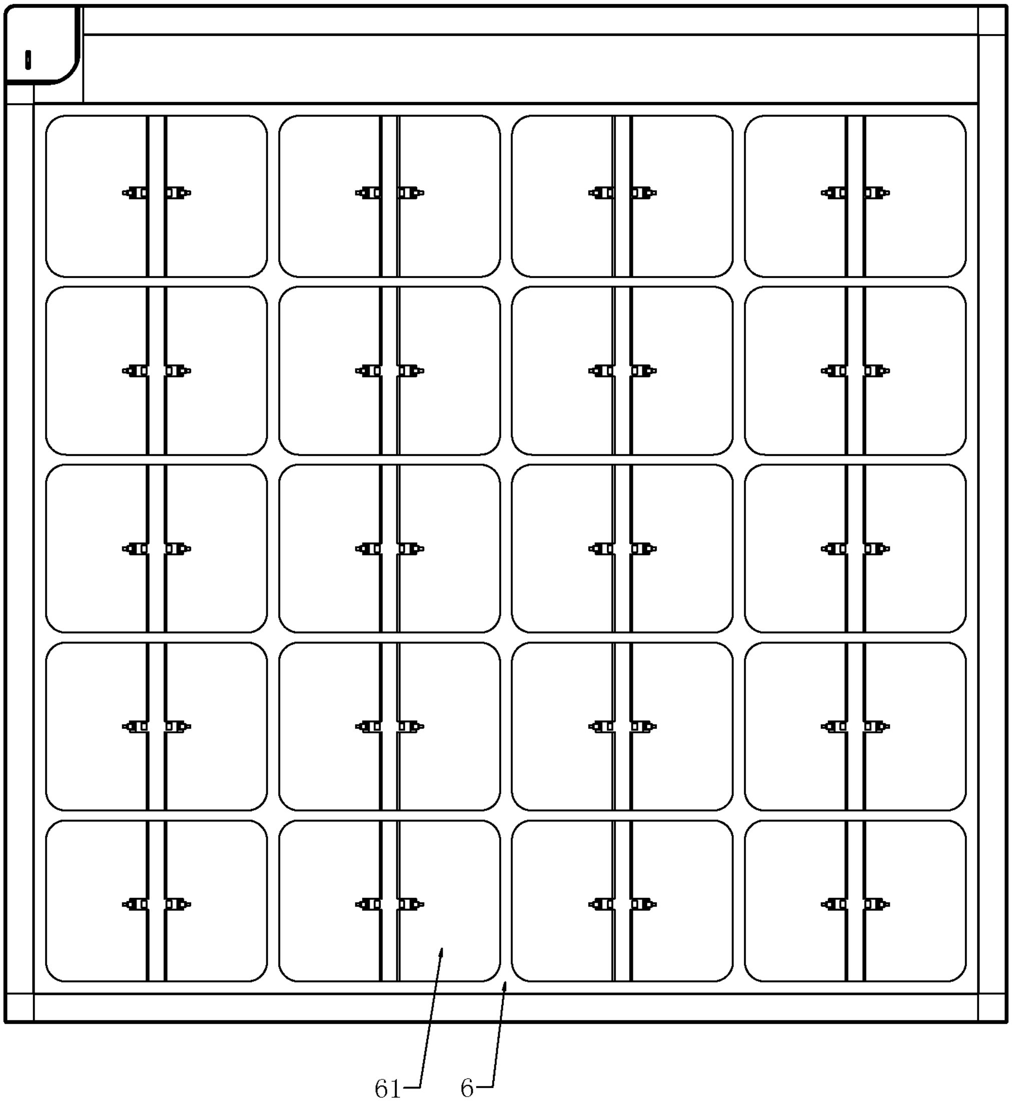
FIG. 10 is a schematic diagram of an air purification device according to another embodiment of the present application (filter element not shown).

In the air purification device of this embodiment, please refer to FIG. 10, the frame body 3 is provided with a discharge conductor 56, and the discharge conductor 56 is provided with a discharge conductive hole 561 matching with the electrode heads 54.

Specifically, the discharge conductor 56 is made of a metal material or a nonmetal material, and a plurality of discharge conductive holes 561 are provided, and the plurality of discharge conductive holes 561 are in a rectangular array, and the discharge conductive holes 561 are round holes, elliptical holes, polygonal holes, rectangular holes or nearly round holes with radian angles.

Preferably, each discharge conductive hole 561 is arranged in a rectangular shape, and rounded corners are formed at four corners of each discharge conductive hole 561. The full distribution rate of rectangular rounded corners is the highest, there are few blind spots, the through-hole area of discharge conductor 56 is full, the head-on wind speed is uniform, and the ventilation resistance is reduced.

In the air purification device of this embodiment, please refer to FIG. 1. The frame body 3 includes a plurality of frames 31 corresponding to the filter element 1, and the frames 31 are connected end to end to form an accommodation space for accommodating the filter element 1 and the charging mechanism 5.

Figure 16:
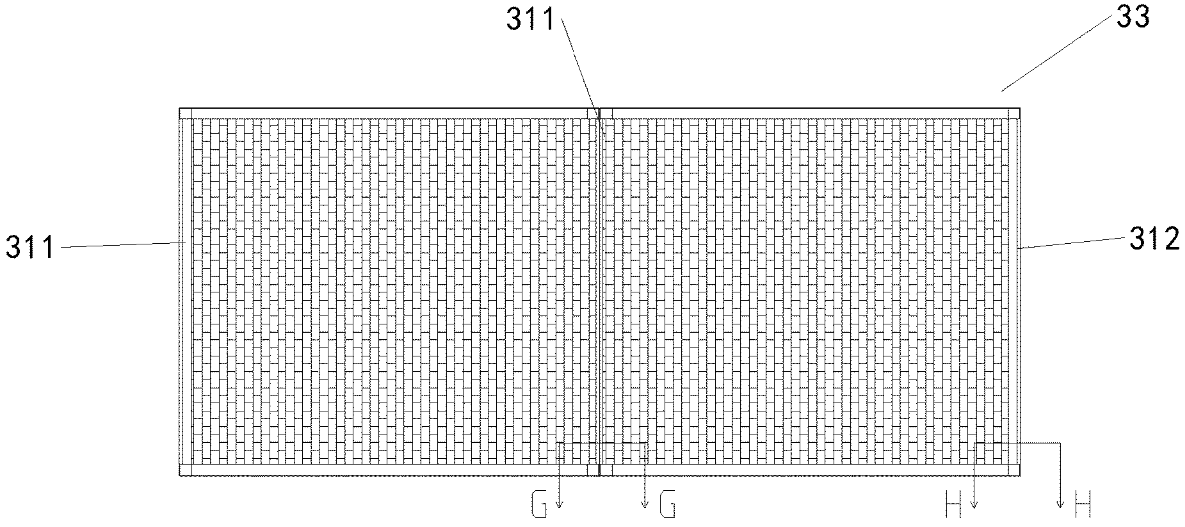
FIG. 16 is a schematic diagram of the splicing state of the air purification device according to an embodiment of the present application.
Figure 17:
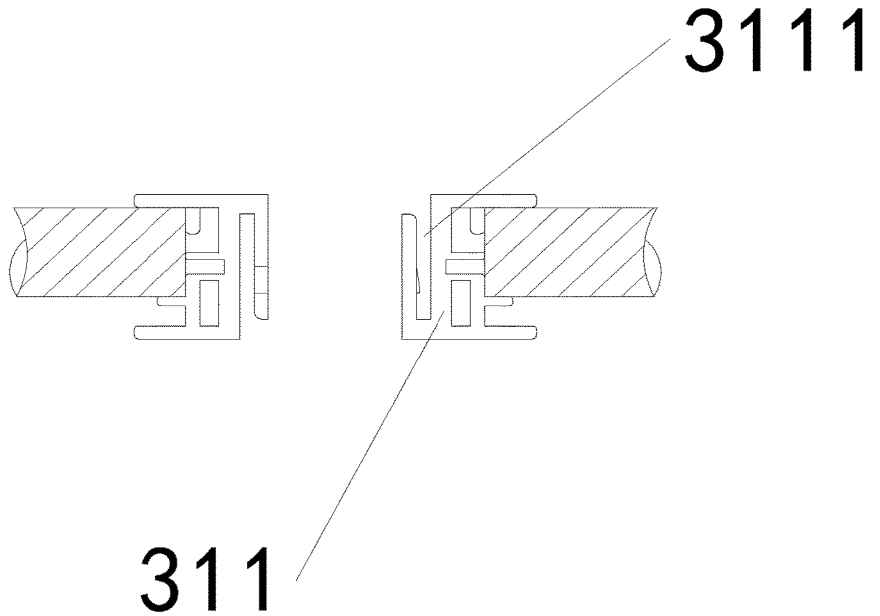
FIG. 17 is a sectional view taken along the line G-G in FIG. 16.
Figure 18:
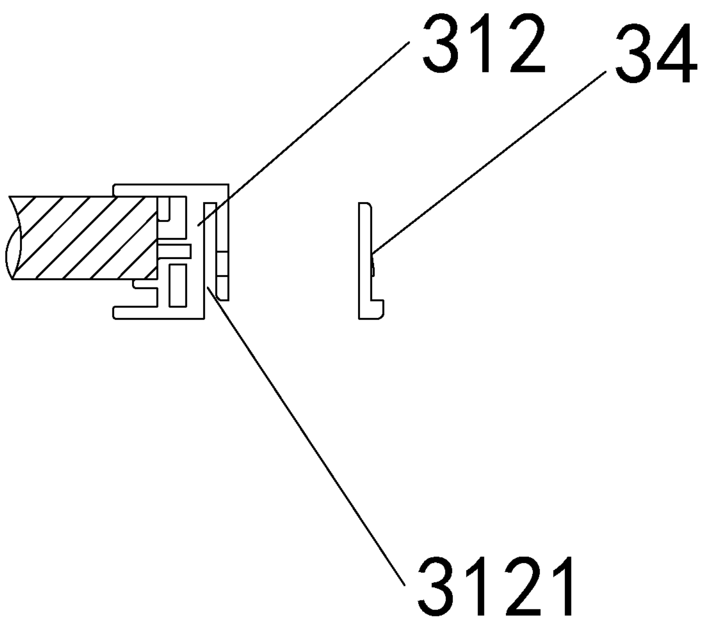
FIG. 18 is a sectional view taken along the line H-H in FIG. 16.

Physically, referring to FIGS. 16 to 18, the frame body 3 includes a first frame 311, a second frame 312, a third frame 313 and a fourth frame 314 which are connected in sequence, and the first frame 311 and the second frame 312 are oppositely arranged, and the third frame and the fourth frame are oppositely arranged, and the first frame 311 and the second frame 312 are complementary structures that can be spliced. The side of the first frame 311 far away from the second frame 312 is provided with a first splicing groove 3111, and the side of the second frame 312 far away from the first frame 311 is provided with a second splicing groove 3121. The opening directions of the first splicing groove 3111 and the second splicing groove 3121 are opposite.

Through the above arrangement, the function of infinite splicing of the air purification device in this embodiment is realized, and a single module can be engaged with the second splicing groove 3121 of an adjacent module through the first splicing groove 3111, so as to realize the combination between modules, realize the infinite splicing of the air purification device, improve the assembly efficiency and use efficiency of the filter element 1, and facilitate the maintenance and replacement of the filter element 1. In the actual use process, the clamping groove can be installed from the side of the air duct or air duct of the application equipment for drawing and installation, and it can also be installed through the front of the filter section of the application equipment.

Figure 11:
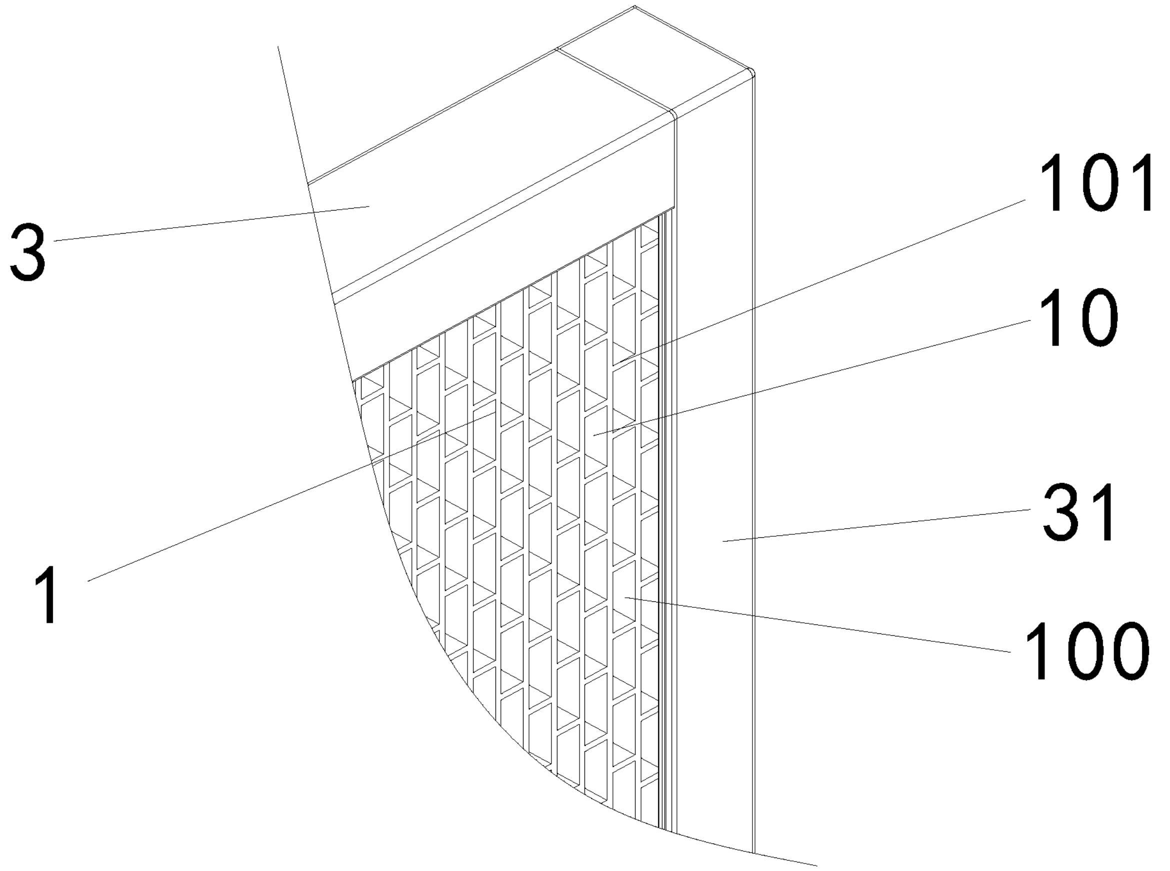
FIG. 11 is a partial schematic diagram of a micro-electrostatic module according to an embodiment of the present application.

Please refer to FIG. 11, on the tail filter element 1 without splicing the filter element 1, the plugs 34 are plugged in the first splicing groove 3111 and the second splicing groove 3121 for flattening, so as to avoid the snap in the splicing structure from being broken, and at the same time, the overall aesthetics of the filter element 1 can be improved.

Preferably, partitions are arranged inside the third frame and the fourth frame to divide the accommodating space into two parts, one part for accommodating the filter element 1 and the other part for accommodating the charging mechanism.

In the air purification device of this embodiment, the electrode body 52 is connected to a high-voltage power supply, which is a built-in high-voltage power supply or an external high-voltage power supply.

Figure 9:
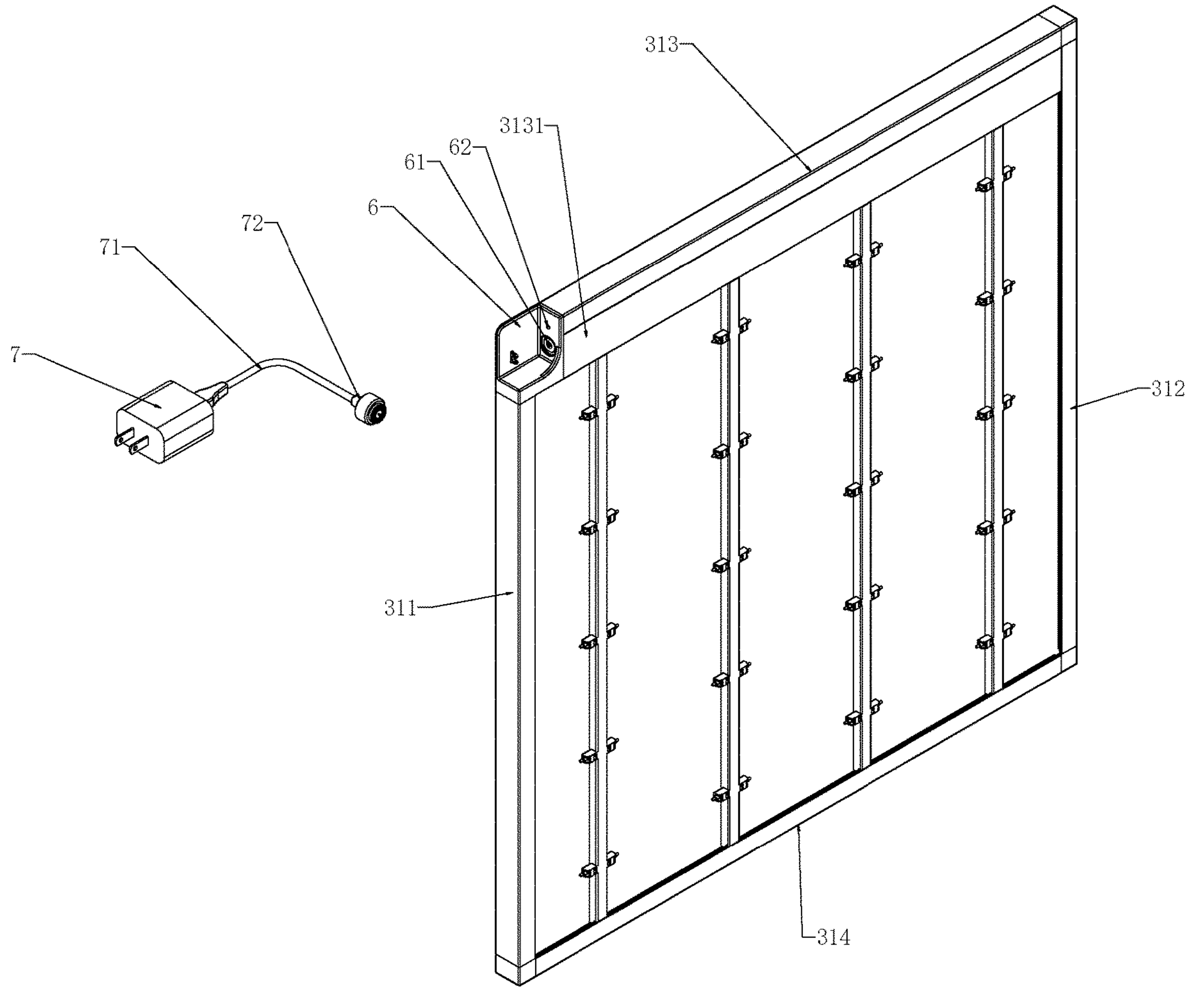
FIG. 9 is a schematic diagram of an air purification device according to other embodiment of the present application.

Preferably, referring to FIG. 9, a built-in high-voltage power supply is adopted, and a power supply bin 3131 is added on one side of the frame body 3. Specifically, the power supply bin 3131 is located on the third frame 313 or the fourth frame 314, and the high-voltage power supply is placed in the power supply bin 3131, which is electrically connected with the charging mechanism 5 and the filter element 1. The built-in electrical connection of the power supply is simpler, and the later maintenance operation is simple.

In the air purification device of this embodiment, the high-voltage power supply is connected with an external power supply through a power adapter 7, and one end of the power supply bin 3131 is provided with a power switching part 6 for switching the power supply. The power switching part 6 is provided with a magnetic attraction female head 61 for providing electrical connection for the high-voltage power supply, and the power adapter 7 is connected with a magnetic attraction male head 72 matching with the magnetic attraction female head 61.

It should be noted that the magnetic attraction male head 72 is provided with a contact spring pin, and the magnetic attraction male head 72 and the magnetic attraction female head 61 are respectively provided with N/S pole magnetic attraction, so that the docking between the magnetic attraction male head 72 and the magnetic attraction female head 61 is reliable and stable, and the maintenance and disassembly are convenient.

Specifically, referring to FIG. 9, the power switching part 6 is also fixed with a snap ring, and the power line 71 for connecting the power adapter 7 and the magnetic attraction male head 72 can be fixed by the snap ring, and the power line 71 can be bent in multiple directions under the fixing action of the snap ring, so as to take into account the installation of the air purification device in the pipeline.

Preferably, the power switching part 6 is also provided with an indicator lamp 62 and a light guide column, and the charged ends of the indicator lamp 62 and the light guide column are embedded in the power supply bin, and epoxy glue is encapsulated in the power supply bin, so that the whole power supply bin is sealed and waterproof, and the power supply can be dust-proof and moisture-proof.

In the air purification device of this embodiment, please refer to FIGS. 11 to 15. The filter element 1 is provided with a fixing groove 2, and the frame 31 is connected with the filter element 1 through a fixing part, which is embedded in the fixing groove, and the fixing part is connected with the frame and the filter element to fix the filter element.

By arranging the fixing parts 4, the fixing parts 4 are embedded in the fixing grooves 2 and respectively connected with the frame body 3 and the filter element 1, so that the filter element 1 is fixed on the frame body 3, and the installation of the filter element 1 is completed; by arranging the fixing grooves 2 on the filter element 1 and forming a step structure on the frame body 3, the step structure and the fixing grooves 2 are mutually locked and fixed, so that the filter element 1 is fixed, the dust-containing surface required for fixing the filter element 1 is reduced, and the connection between the frame 31 and the filter element 1 is reduced. The overall thickness of the outer frame is reduced, the structural design of the ultra-thin frame is realized, the dust holding capacity of the micro-electrostatic module is improved, the use cost of the filter element is reduced, the purification efficiency is improved, and the technical problem that the purification efficiency and dust holding capacity of the micro-electrostatic module are lost because the outer frame occupies the size in the thickness direction in the related art is solved.

The micro-electrostatic module in this embodiment improves the dust holding capacity and purification efficiency of the micro-electrostatic module, reduces the use cost of the filter element, solves the sealing problem of the micro-electrostatic module by adopting the thermal cutting process, and ensures that the ultra-thin micro-electrostatic module in this embodiment has an ideal waterproof effect.

Figure 12:
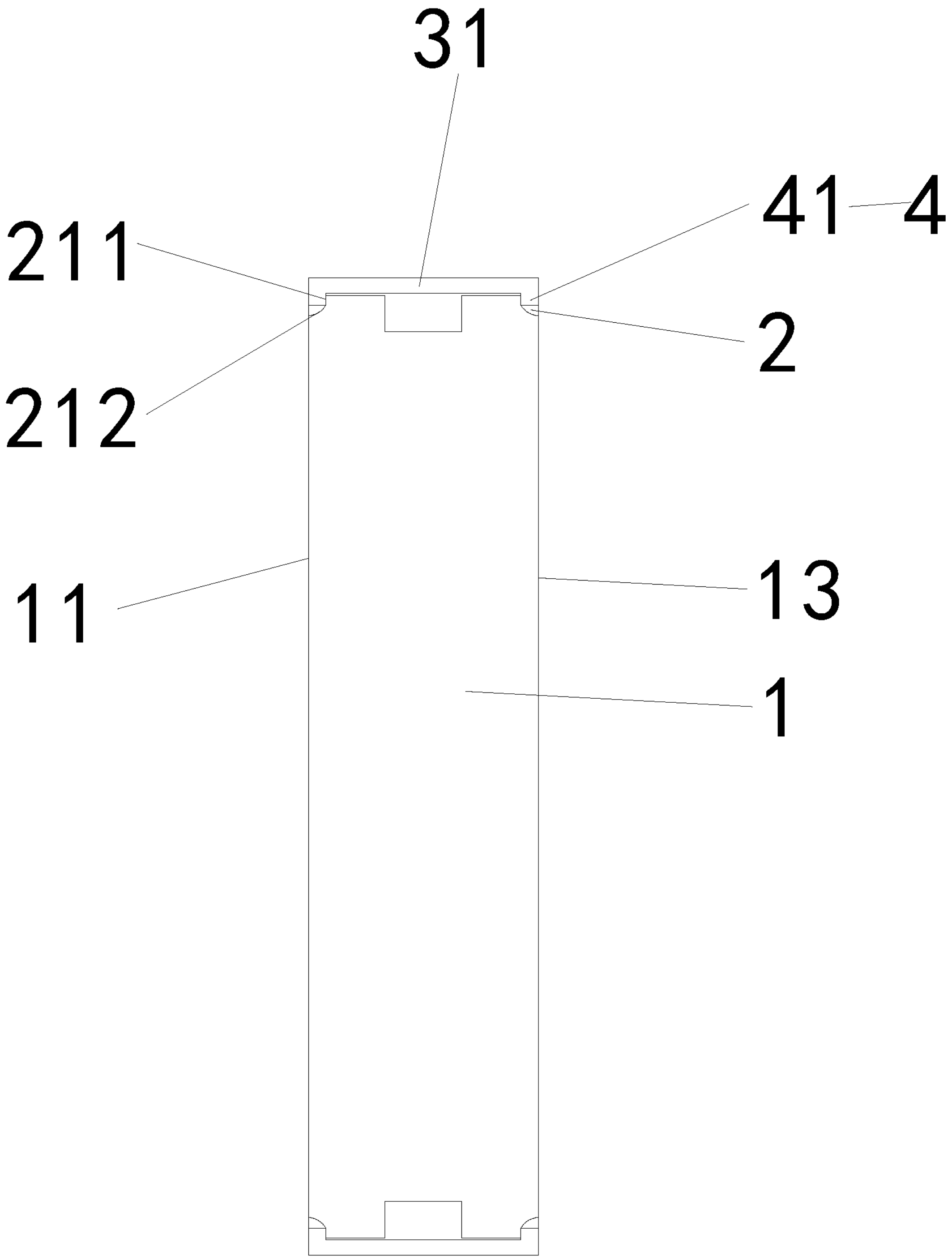
FIG. 12 is an assembly schematic diagram of the frame body and the micro-electrostatic module according to a first embodiment of the present application.

In the air purification device of this embodiment, please refer to FIG. 12, the fixing parts 4 includes a boss 41 integrally formed with the frame 31. The boss 41 extends in the direction close to the filter element 1, and the boss 41 is embedded in the fixing groove 2. By arranging the boss 41, the boss 41 is embedded in the fixing groove 2, and the boss 41 and the fixing groove 2 are engaged with each other to increase the supporting force of the fixing parts 4 to the filter element 1, and the filter element 1 is stopped and fixed by the boss 41, so that the dust-containing surface of the filter element 1 occupied by the frame 31 is reduced, and the thickness of the frame is reduced.

Optionally, the boss 41 is an L-shaped boss.

In the air purification device of this embodiment, referring to FIGS. 12 to 15, the fixing groove 2 includes a first connecting surface 211 and a second connecting surface 212 which are connected with each other.

Specifically, the fixing groove 2 is formed on the side wall of the filter element 1 to increase the wrapping property of the frame body 3 and the fixing parts 4 to the filter element 1 and improve the fixing strength of the filter element 1.

It can be understood that the fixing groove 2 can also be formed on the end face of the filter element 1, and spaced from the first accommodating groove 51 on the end face, so that the dust accommodating surface of the filter element 1 can reach the maximum.

Specifically, the fixing groove 2 has an L-shaped structure, which is locked and fixed with the boss 41. By adopting the L-shaped fixing groove 2, the opening area of the fixing groove 2 can be reduced, and the dust containing surface of the filter element 1 can be increased. In addition, the boss 41 and the L-shaped fixing groove 2 are attached to each other, which reduces the possibility of deformation of the frame 31 and improves the structural strength of the frame 31.

In the air purification device of this embodiment, the second connecting surface 212 is an arc surface.

It should be noted that by setting the second connecting surface 212 as an arc surface, after the frame body 3 and the filter element 1 are assembled, there is still a gap in the fixing groove 2 except the boss 41. At this time, insulating glue can be injected to improve the stability of assembly, and at the same time, the sealing effect of the filter element 1 is improved to prevent the conductive material in the filter element 1 from leaking and discharging.

In the air purification device of this embodiment, the fixing groove 2 includes a first connecting surface 211, and the first connecting surface 211 is an inclined surface.

Specifically, the fixing groove 2 is opened on the side wall of the filter element 1. By using the fixing groove 2 with a single surface, the cross-sectional area and capacity of the fixing groove 2 can be reduced, and the filling and using amount of insulating adhesive can be reduced, and at the same time, the size of the avoidance groove 104 can be reduced, and the available area of the conductive material 103 can be increased.

Preferably, the first connecting surface 211 is an arc surface. By setting the first connecting surface 211 as an arc surface, compared with the first connecting surface 211 with an inclined surface structure, when the fixing groove 2 is filled with insulating glue, the adhesive force of the insulating glue can be increased, and the assembly strength of the filter element 1 and the frame body 3 can be increased.

In the air purification device of this embodiment, the filter element 1 includes a first dust-collecting surface 11 and a second dust-collecting surface 13 which are oppositely arranged, and a plurality of air channels 10 for air circulation are arranged between the first dust-collecting surface 11 and the second dust-collecting surface 13. The first dust-collecting surface 11 protrudes from the frame 31 along the extending direction of the air channel 10. And/or, the second dust collecting surface 13 is arranged to protrude from the frame 31 along the extending direction of the air channels 10.

It can be understood that by adopting the assembly structure of the filter element 1 in the present application, the thickness of the filter element 1 can be adaptively thickened or the frame with smaller width specification can be adopted, so that the assembly of the filter element 1 can be stably realized, and the length of the air channel can be increased by increasing the thickness of the filter element 1, thereby increasing the dust collection efficiency of the filter element 1.

In some embodiments, the structural design of increasing the thickness of one side of the filter element 1 can be adopted to thicken one side of the first dust-collecting surface 11 or the second dust-collecting surface 13.

In some embodiments, both the first dust-collecting surface 11 and the second dust-collecting surface 13 can be thickened by adopting the structural design that both sides of the filter element 1 are increased in thickness.

In the air purification device of this embodiment, the fixing parts 4 includes an insulating glue 42, and the insulating glue 42 is filled between the frame 31 and the fixing groove 2. By filling the insulating glue 42 in the fixing groove 2, the frame 31 is firmly connected with the fixing groove 2, and at the same time, it plays a sealing role, preventing the problem that the edge of the fixing groove 2 and the conductive material 103 are too thin and too close to cause the discharge of the conductive material, and improving the electrical safety.

In the ultra-thin micro-electrostatic module of this embodiment, the filter element 1 includes a plurality of dust-collecting sheets 100 and a plurality of spacers 101 arranged between the dust-collecting sheets 100, an air channels 10 are formed between the dust collecting sheets 100 and the spacers 101, and a conductive material 103 is wrapped in the dust-collecting sheets 100, and the conductive material 103 includes an avoidance groove 104, which is arranged corresponding to the fixing groove 2, and the conductive material 103 is electrically connected with a high-voltage power supply through the electrode body 52.

It should be noted that the micro-electrostatic module forms an electrode plate by wrapping the conductive material 103 with a dielectric material, and captures charged particles in the air by using the strong electric field formed inside the electrode plate after the electrode plate is electrified.

Specifically, the electrode body 52 is in contact with the conductive material 103 located in the dust-collecting sheet 100 to achieve electrical connection.

Specifically, after the fixing groove 2 is integrally formed on the filter element 1, in order to prevent the distance between the fixing groove 2 and the conductive material inside the dust-collecting sheet from being too close, and to prevent the conductive material and the external conductor from discharging, the conductive material is adaptively shrunk, and an avoidance groove 104 is formed on the conductive material 103 to avoid the fixing groove 2. The shape of the avoidance groove 104 is adapted to the shape of the fixing groove 2, and the distance between the edge of the conductive material 103 and the edge of the dust-collecting sheet is ensured to meet the electrical safety distance. At the same time, in order to ensure the purification effect of the micro-electrostatic module, the larger the area of the conductive material 103, the greater the purification effect and dust holding capacity of the micro-electrostatic module. Therefore, the distance between the edge of the avoidance groove 104 and the edge of the dust-collecting sheet is not less than the distance between the conductive material 103 at the non-avoidance groove 104 and the edge of the dust-collecting sheet, thus ensuring electrical safety and maximizing the purification effect and dust holding capacity.

In the ultra-thin micro-electrostatic module of this embodiment, please refer to FIG. 16, the frame body 3 includes a plurality of connecting parts 33, which are respectively connected with two adjacent frames 31, so that the frames 31 are connected end to end. Specifically, the connecting part 33 is a corner tenon, and a plurality of frames 31 are assembled through the connecting parts 33.

In the ultra-thin micro-electrostatic module of this embodiment, there are a plurality of fixing parts 4 and a plurality of fixing grooves 2, and the fixing parts 4 are arranged in one-to-one correspondence with the frames 31.

It can be understood that each frame 31 is provided with a fixing part 4, and the filter element 1 is provided with a corresponding fixing groove 2, which improves the stability of the assembly of the filter element 1 and the frame body 3.

Figure 15:
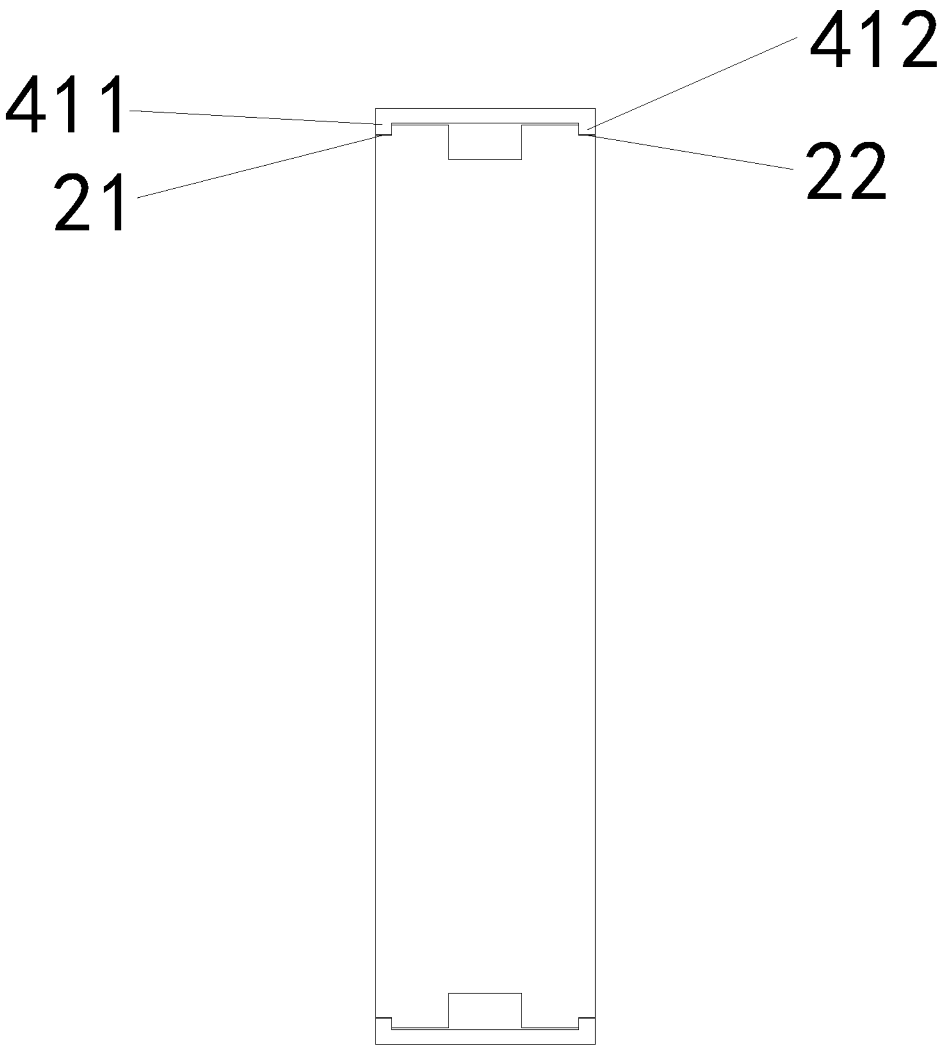
FIG. 15 is a schematic structural view of the first fixing part according to an embodiment of the present application.

In the ultra-thin micro-electrostatic module of this embodiment, please refer to FIG. 15, the fixing parts 4 include a first fixing part 411 and a second fixing part 412 arranged at intervals. The first fixing part 411 is connected with one end of the frame 31, and the second fixing part 412 is connected with one end of the frame 31 far away from the first fixing part 411. The fixing groove 2 includes a first fixing groove 21 and a second fixing groove 22 which are arranged at intervals. The first fixing groove 21 is arranged corresponding to the first fixing part 411, and the second fixing groove 22 is arranged corresponding to the second fixing part 412.

Specifically, the first dust-collecting surface 11 and the second dust-collecting surface 13 of the filter element 1 are both provided with the assembly structure in this embodiment, and the stability of the assembly of the filter element 1 and the frame body 3 is improved through the above arrangement.

It should be noted that the first fixing part 411 and the second fixing part 412 and the first fixing groove 21 and the second fixing groove 22 can be designed symmetrically or asymmetrically at the same time.

In the ultra-thin micro-electrostatic module of this embodiment, please refer to FIG. 15, the fixing grooves 2 include a first fixing groove 21 on the leeward side of the filter element 1, and the boss 41 is embedded in the first fixing groove 21 to support the filter element 1.

Specifically, the air first passes through the windward side of the ultra-thin micro-electrostatic module and then passes through the leeward side. In order to increase the structural strength of the filter element 1, the fixing part adopts the structural design of a boss, that is, the first fixing groove 21 is formed on the leeward side of the filter element 1, and the boss is engaged with the first fixing groove 21, so that the filter element 1 is pushed against the boss structure by wind pressure, which plays a good supporting role, reduces the use of frame materials, reduces the difficulty of assembly, and can prevent the filter element 1 from being deformed and detached from the frame body 3, thus ensuring the assembly strength and stability of the filter element 1.

In the ultra-thin micro-electrostatic module of this embodiment, please refer to FIG. 15, the fixing part 4 includes a first fixing part 411 and a second fixing part 412 arranged at intervals. The first fixing part 411 is connected with one end of the frame 31, and the second fixing part 412 is connected with one end of the frame 31 far away from the first fixing part 411. The fixing grooves 2 include a first fixing groove 21 and a second fixing groove 22 which are arranged at intervals. The first fixing groove 21 is arranged corresponding to the first fixing part 411, and the second fixing groove 22 is arranged corresponding to the second fixing part 412.

Embodiment 1

Referring to FIG. 12, the first fixing part 411, the second fixing part 412, the first fixing groove 21 and the second fixing groove 22 adopt symmetrical structural designs. The first fixing part 411 and the second fixing part 412 have a boss structure, and the first fixing groove 21 and the second fixing groove 22 include a first connecting surface 211 and a second connecting surface 212, and the second connecting surface 212 is an arc surface.

It can be understood that when the above-mentioned embodiment is adopted, insulating glue can be continuously filled in the fixing groove, so that the fixing strength and sealing performance of the filter element 1 can be improved, and at this time, the supporting strength of the frame body 3 to the filter element 1 is higher.

Embodiment 2

Figure 13:
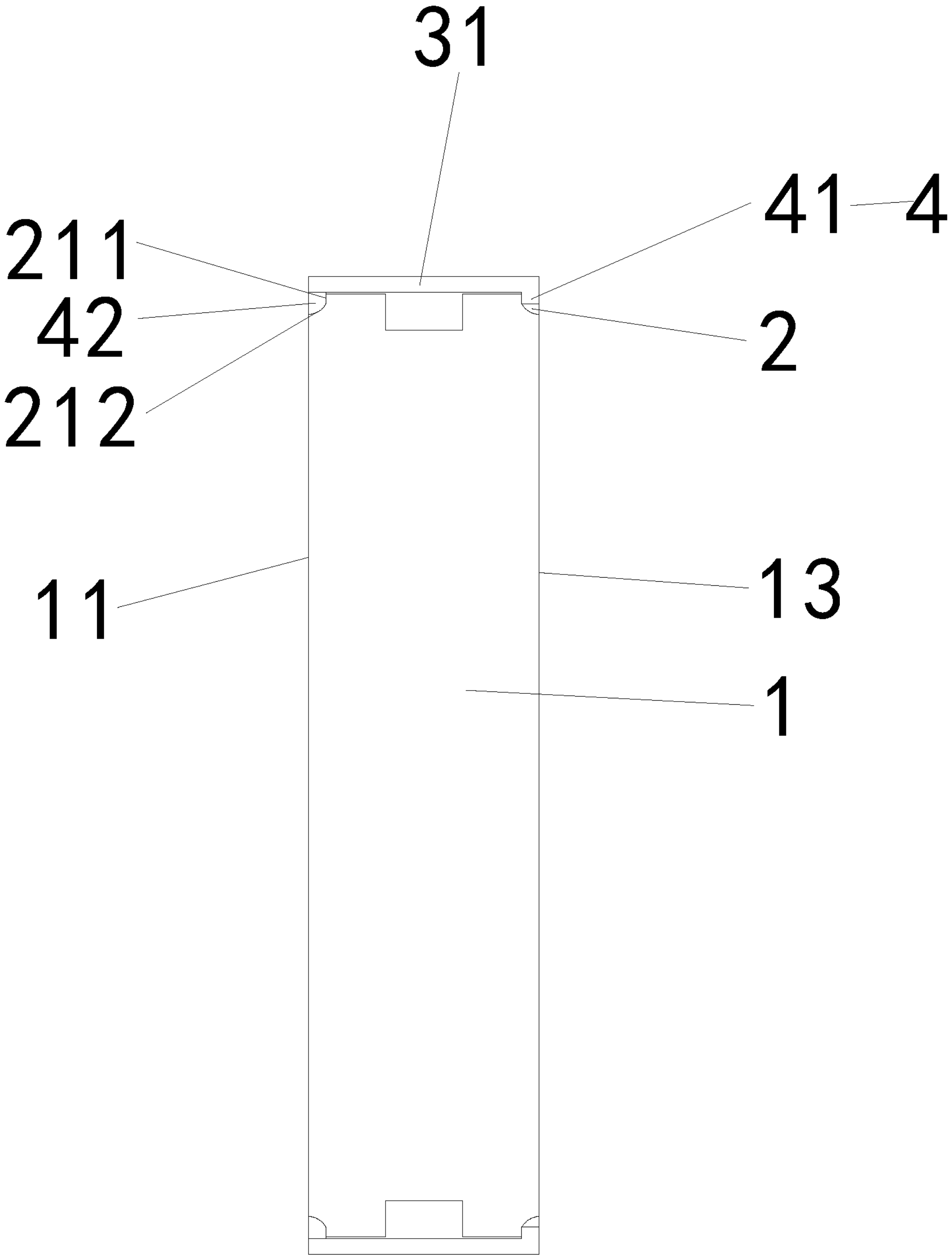
FIG. 13 is an assembly schematic diagram of the frame body and the micro-electrostatic module according to a second embodiment of the present application.
Figure 14:
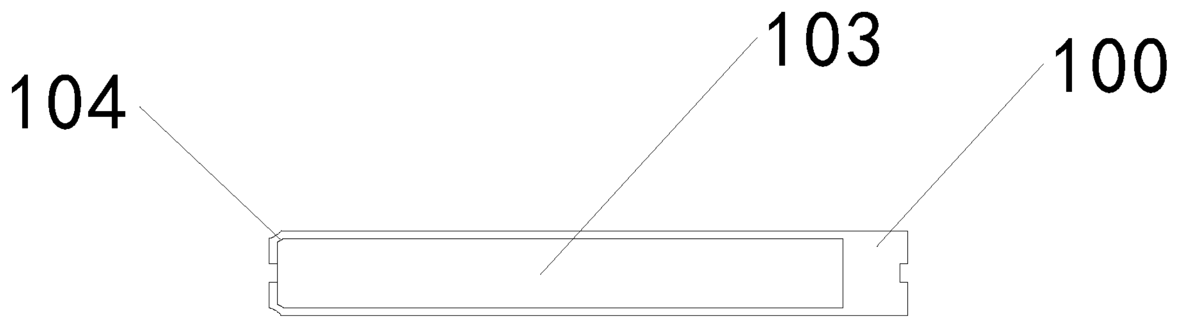
FIG. 14 is a schematic structural view of the dust-collecting sheet according to an embodiment of the present application.

Referring to FIG. 13, the first fixing part 411 and the second fixing part 412 adopt asymmetric structural design, and the first fixing groove 21 and the second fixing groove 22 adopt symmetrical structural design. The first fixing part 411 is made of insulating glue, and the second fixing part 412 has a boss structure. The first fixing groove 21 and the second fixing groove 22 include a first connecting surface 211 and a second connecting surface 212, and the second connecting surface 212 is an arc surface.

It can be understood that when the above embodiment is adopted, the structure that the boss is engaged with the fixing groove on the leeward side can play a good supporting role.

It can be understood that when the above embodiment is adopted, the second fixing groove 22 can be filled with insulating glue continuously, and both fixing grooves are filled with insulating glue, so that the sealing performance of the filter element 1 can be improved.

Figure 19:
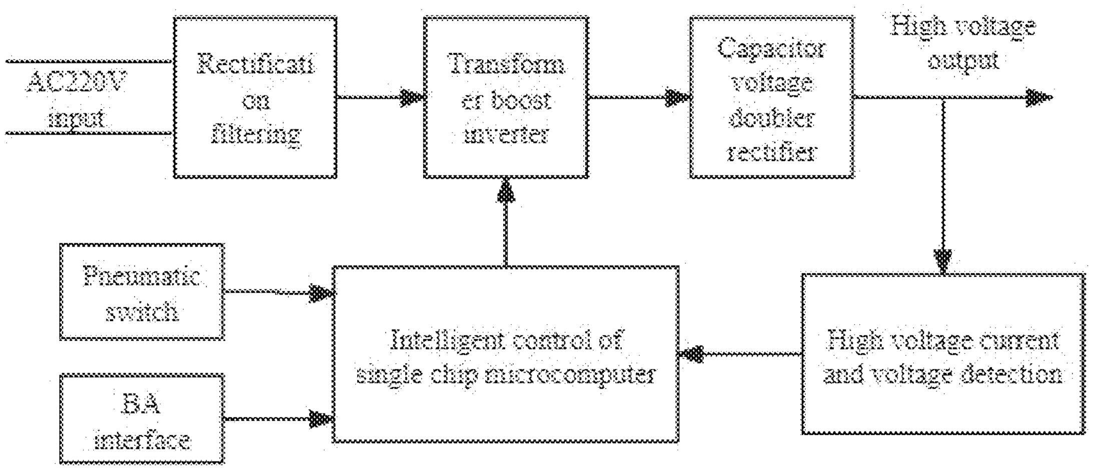
FIG. 19 is a flowchart of the control method according to an embodiment of the present application.
Figure 20:
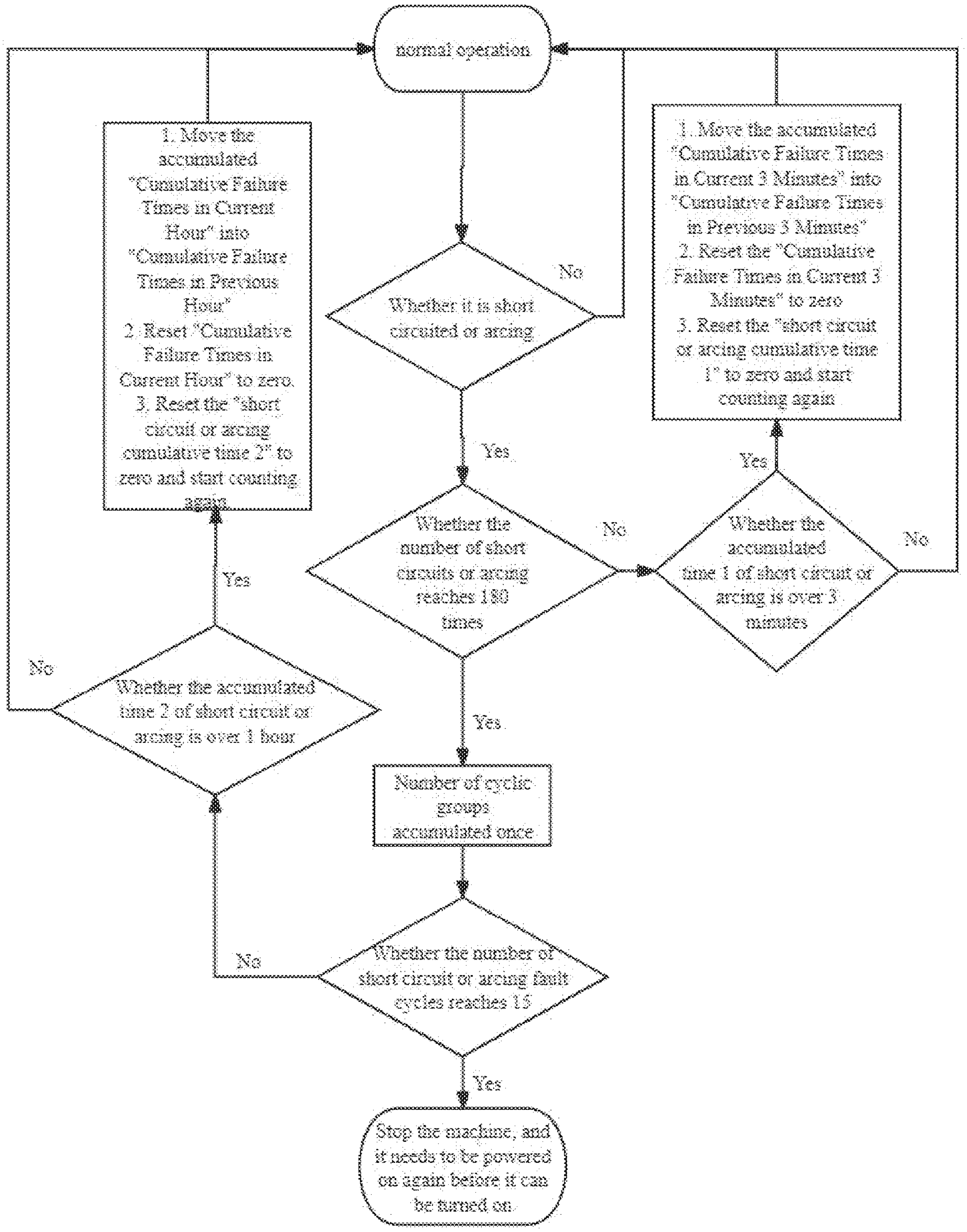
FIG. 20 is a protection logic diagram of the high-voltage power supply according to an embodiment of the present application.

In a second aspect, the present application provides a control method, please refer to FIGS. 18 to 19, for controlling the above air purification device, including: obtaining, by a high-voltage power supply, the wind dynamic situation and determining whether it is necessary to supply power to the micro electrostatic device; when power supply is needed, a switch SB and a fuse FU entering a power transformer TR, being rectified by diodes VD1~VD4, and being filtered by capacitor C1, and then providing a bias voltage to the base of the VT through a primary winding N1 stage of a booster transformer TU, a potentiometer RP and a resistor R, and at the same time, supplying power to a collector of the VT through N1 and N2, and the VT starts to conduct; making, by a oscillation of the booster transformer TU, a current of the N1 further strengthen the current of the base of VT, and making the VT turn off from saturated on state, thus making the oscillation circuit turn on and off repeatedly; and making, a single-chip microcomputer in the high-voltage power supply, a logical judgment according to a monitored high voltage and current, and determining whether to stop outputting high-voltage.

By modifying the input circuit and output circuit, the high-voltage power supply inputs DC12V and outputs high voltage of −9 kV. In order to ensure safety, the input DC12V and the high-voltage output are completely isolated, so that the output high voltage will not have a common loop with the input DC12V, and the single high voltage will only discharge air, and the high voltage will not form a loop with the high voltage by human hands, and there will be no electric shock.

The present application has been described in detail above. The above is only the preferred embodiment of the present application. If the scope of implementation of the present application cannot be limited, that is, all the equal changes and modifications made according to the scope of this application should still fall within the scope of the present application.

What is claimed is:

1. An air purification device, comprising:

a frame body, wherein one side of the frame body is provided with an air inlet and another side is provided with an air outlet, and the frame body is used for accommodating a micro-electrostatic module and a charging mechanism;

the micro-electrostatic module comprising a filter element, wherein the filter element comprises a plurality of air channels for air circulation, and the filter element is arranged near the air outlet; and the charging mechanism is located at one side of the filter element away from the air outlet, and comprising a plurality of electrode heads distributed on an air inlet surface of the filter element relative to an airflow from the air inlet to an air outlet of the frame body, so that a projection area of a discharge area of the charging mechanism onto the air inlet surface of the filter element completely covers the filter element without charging blind area;

wherein the charging mechanism further comprises:

an accommodating groove, and the accommodating groove is inside the frame body; and an electrode body, and the electrode body is arranged along a length direction of the accommodating groove, and each of the plurality of electrode heads extends through a groove wall of the accommodating groove and is connected with the electrode body;

wherein when each electrode head is made of a hard material, the electrode head extends within an outer surface of the frame body, and when each electrode head is made of flexible materials, the electrode head is extendable beyond the outer surface of the frame body; an angle between an arrangement direction of each electrode head and a plane in which the frame body is located is greater than or equal to 0 degrees and less than or equal to 60 degrees;

wherein the arrangement direction means a longitudinal extension direction of each electrode head; the plane in which the frame body is located means an air inlet plane of the frame body, which is perpendicular to the airflow; the angle is formed between the longitudinal extension direction of each electrode head and the air inlet plane of the frame body, and ranges from 0° to 60°.

2. The air purification device of claim 1, wherein the charging mechanism further comprises a plurality of accommodating grooves and a plurality of electrode bodies, the plurality of accommodating grooves are arranged at intervals, and the plurality of electrode bodies located in different the accommodating grooves are connected end to end in sequence.

3. The air purification device of claim 2, wherein two sides of the accommodating groove are connected with the electrode heads, and a distance between two adjacent electrode heads located on a same side of a same accommodating groove is equal to the distance between two adjacent accommodating grooves.

4. The air purification device of claim 3, wherein the electrode heads located on both sides of the same accommodating groove are arranged in parallel to form a plurality of electrode head pairs, and the electrode head pairs located in different accommodating grooves are arranged in a staggered or matrix manner.

5. The air purification device of claim 3, wherein the electrode heads located at two sides of the same accommodating groove are staggered.

6. The air purification device of claim 1, wherein the charging mechanism further comprises a conductive discharge plate, and the conductive discharge plate is located at one side of the electrode heads away from the filter element, and the conductive discharge plate is provided with a discharge conductive hole matched with the electrode head.

7. The air purification device of claim 1, wherein the accommodating groove is detachably connected with the inside of the frame body, and two ends of the accommodating groove are provided with notches matched with the frame body, and when the accommodating groove is installed inside the frame body, the accommodating groove does not exceed the outer surface of the frame body.

8. The air purification device of claim 1, wherein the frame body comprises a first frame and a second frame, the first frame and the second frame are oppositely arranged, and the first frame and the second frame are splicable complementary structures.

9. The air purification device of claim 1, wherein a power supply bin is arranged on the frame body, the power supply bin comprises a high-voltage power supply, and the high-voltage power supply is electrically connected with the charging mechanism and the filter element.

10. The air purification device of claim 9, wherein the high-voltage power supply is connected with an external power supply through a power adapter, one end of the power supply bin is provided with a power supply switching part for switching the power supply, the power supply switching part is provided with a magnetic attraction female head for providing electrical connection for the high-voltage power supply, and the power adapter is connected with a magnetic attraction male head matched with the magnetic attraction female head.

11. The air purification device of claim 1, wherein the filter element is provided with a fixing groove, the frame body is connected with the filter element through a fixing part, the fixing part is embedded in the fixing groove, and the fixing part is connected with the frame body and the filter element to fix the filter element.

12. The air purification device of claim 10, wherein the fixing part comprises a boss integrally formed with the frame body, and the boss extends along a direction close to the filter element, and the boss is embedded in the fixing groove.

13. The air purification device of claim 11, wherein the filter element comprises a plurality of dust-collecting sheets arranged in a stacked manner and a plurality of spacers arranged between the dust-collecting sheets, the air channels are formed between the dust-collecting sheets and the spacers, and a conductive material are wrapped in the dust-collecting sheets, and the conductive material comprise an avoidance groove, and the avoidance groove is arranged corresponding to the fixing groove.

* * * * *